April 12, 1949.  J. V. GIESLER  2,466,846
PRESSURE MEASURING DEVICE
Filed Dec. 27, 1945
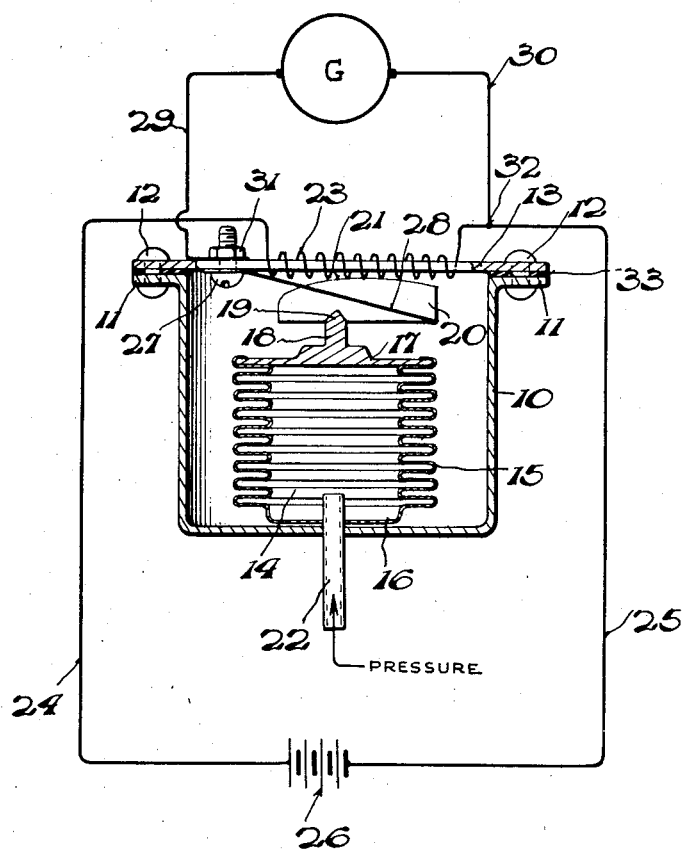
INVENTOR.
BY *Jean V. Giesler*
*Cameron, Kerkam & Sutton*
attorneys Patented Apr. 12, 1949

2,466,846

UNITED STATES PATENT OFFICE 2,466,846

PRESSURE MEASURING DEVICE

Jean V. Giesler, Knoxville, Tenn., assignor to Robertshaw-Fulton Controls Company, a corporation of Delaware Application December 27, 1945, Serial No. 637,421

3 Claims. (Cl. 73—398)

This invention relates to measuring instruments, and more particularly to instruments for measuring pressure or temperature as a function of pressure.

It has heretofore been proposed to provide a measuring instrument wherein the thermostat or pressure responsive element actuates a variable resistance with changing temperature or pressure, utilizing the change of voltage as determined by a galvanometer in circuit with said variable resistance as a measure of the temperature or pressure.

It is an object of this invention to provide an improved device of the type characterized which is more simple, compact and rugged, without sacrifice of accuracy or efficiency, than heretofore proposed. Other objects will appear as the description of the invention proceeds.

The invention is capable of receiving a variety of expressions only one of which is shown diagrammatically on the accompanying drawing, and it is to be expressly understood that the drawing is for purposes of illustration only, and it is not to be construed as a definition of the limits of the invention, reference being had to the appended claims for that purpose.

Referring in detail to the accompanying drawing which illustrates diagrammatically an embodiment of the present invention:

10 designates a suitable support for mounting the instrument at any desired location, said support preferably taking the form of a cup-shaped housing or a U-shaped bracket provided with a flanged extremity 11. Suitably attached to said flanges across the mouth or open end of said housing or bracket, as by screws or rivets 12, is a bar 13, preferably of nonmetallic material and of any suitable cross sectional shape, although said bar may be made of metal and the electrical parts hereinafter described insulated therefrom as will be apparent to those skilled in the art.

Mounted within the housing or bracket 10 and supported thereon in any suitable way is an expansible and collapsible chamber 14, here shown as having a peripheral wall composed of an expansible and collapsible corrugated tubular wall or bellows 15 provided with end walls 16 and 17, although it is to be understood that any other suitable form of expansible and collapsible chamber may be used. As here shown, end wall 16 is the stationary wall and is shown as integrally formed with the bellows 15, although if preferred a separate end wall may be hermetically sealed to the bellows. End wall 17, which is the movable end wall, is shown as hermetically sealed to the bellows 15, but if a separate end wall 16 is used, end wall 17 may be made integral with the bellows. End wall 17 has formed thereon or suitably attached thereto a post 18 shown as terminating in a knife edge 19. Mounted on said knife edge is a lever 20 having an arcuate edge 21 for a purpose to be explained, said edge preferably being struck as the arc of a circle. Chamber 14 is in communication with any suitable source of pressure as by a tube 22 passing through suitable apertures in the housing or bracket 10 and the stationary end wall 16. Tube 22 may extend to any suitable distance from the instrument so far described and communicate with any source of variable pressure, which variable pressure may also be a function of variable temperature as well understood in the art.

Surrounding the bar 13 is a coil 23 in alignment with the lever 20 and of suitable length for engagement with the arcuate edge of the latter preferably throughout its length. Coil 23 may be of any suitable construction and constitutes a resistance of known parameters, and is in circuit through conductors 24 and 25 with any suitable source of electrical energy as the battery 26. Mounted on the bar 13, as by means of a set screw 27, is a spring 28 which is preferably though not necessarily slotted to receive the lever 20 within its slot and which is in electric contact with said lever at or adjacent to the end thereof opposite the post 18. Screw 27 also constitutes a binding post for a galvanometer circuit composed of galvanometer G and conductors 29 and 30, the former being secured in position on the post 27, as by a nut 31, in circuit with the spring 28, and conductor 30 extending from the galvanometer G to conductor 25 at the junction 32. Galvanometer G preferably is graduated in terms of pressure or temperature, depending upon whether the instrument is to be a pressure or temperature measuring instrument.

If the bar 13 is of metallic material, it must be insulated from the housing or bracket 10 and from the connection from spring 28 to conductor 29 through binding post 27, such insulation being indicated at 33.

In operation, electric current of predetermined voltage is supplied by the battery 26 to the coil 23. The lever 20 is held by spring 28 in contact with the coil 23, arcuate edge 21 of said lever 20 determining the point at which said lever engages said coil. Said point in turn is determined by the degree of expansion or contraction of the chamber 14, expansion of said chamber 14 rocking the lever 20 in a clockwise direction about the point of attachment of spring 28 to lever 20 and the contraction of chamber 14 rocking said lever in the opposite sense. Thereby the extent of the resistance coil 23 in circuit with the galvanometer G through conductors 29 and 30, spring 28 and lever 20 is determined by the extent of expansion or contraction of said chamber 14. Accordingly, the voltage of the galvanometer G is a correct measure of the pressure in the chamber 14 and if said galvanometer is calibrated in terms of temperature or pressure the existing temperature or pressure can be read directly therefrom.

It will now be perceived that the present invention provides a very simple, compact and rugged measuring device for directly and accurately indicating temperature or pressure. While the embodiment of the invention illustrated on the drawing has been described with considerable particularity, it is to be expressly understood that the invention is not restricted thereto as the same is capable of receiving other mechanical expressions, as will now be apparent to those skilled in the art, while changes may be made in the details of construction, arrangement, proportion, etc., without departing from the spirit of this invention. Reference is therefore to be had to the claims hereto appended for a definition of said invention.

What is claimed is:

1. In a measuring device responsive to variations in pressure, an expansible and collapsible chamber in communication with a source of variable pressure, a support of generally U-shaped cross section in which said chamber is supported, a bar supported thereon across the mouth of the U, a resistance coil on said bar, means for supplying the same with electric energy, a lever constituting a rocker provided with an arcuate edge and operatively connected to said chamber at the movable end thereof, means for holding said rocker with its arcuate edge in contact with said coil, and a galvanometer in circuit with one end of said coil and with said rocker.

2. In a measuring device responsive to variations in pressure, an expansible and collapsible chamber in communication with a source of variable pressure, a support of generally U-shaped cross section in which said chamber is supported, a bar supported thereon across the mouth of the U, a resistance coil on said bar, means for supplying the same with electric energy, a lever constituting a rocker provided with an arcuate edge and operatively connected to said chamber at the movable end thereof, a spring mounted on said bar and attached to said rocker for urging said rocker with its arcuate edge in contact with said coil, and a galvanometer in circuit with one end of said coil and with said rocker through said spring.

3. In a measuring device responsive to variations in pressure, an expansible and collapsible chamber in communication with a source of variable pressure, a support of generally U-shaped cross section in which said chamber is supported, a bar supported thereon across the mouth of the U, a resistance coil on said bar, means for supplying the same with electric energy, a lever constituting a rocker provided with an arcuate edge and operatively connected to said chamber at the movable end thereof, a slotted spring mounted on said bar and in the slot of which said rocker is carried, said spring engaging said rocker at the end thereof remote from the connection to said chamber and urging said rocker with its arcuate edge in contact with said coil, and a galvanometer in circuit with one end of said coil and in circuit with said rocker through said spring.

JEAN V. GIESLER.

REFERENCES CITED

The following references are of record in the file of this patent:

UNITED STATES PATENTS

| Number | Name | Date |
| --- | --- | --- |
| 1,398,792 | Paulin | Nov. 29, 1921 |
| 1,908,503 | Behrend et al. | May 9, 1933 |
| 1,921,550 | Swallen | Aug. 8, 1933 |
| 2,256,473 | DeGiers | Sept. 23, 1941 |
| 2,286,717 | Clason | June 16, 1942 |